United States Patent [19]

Gorges

[11] Patent Number: 4,557,100
[45] Date of Patent: Dec. 10, 1985

[54] UNITARY FASTENER INSERT FOR STRUCTURAL SANDWICH PANELS

[75] Inventor: Friedrich J. Gorges, Bellevue, Wash.

[73] Assignee: The Boeing Company, Seattle, Wash.

[21] Appl. No.: 491,952

[22] PCT Filed: Feb. 7, 1983

[86] PCT No.: PCT/US83/00174

§ 371 Date: Feb. 7, 1983

§ 102(e) Date: Feb. 7, 1983

[87] PCT Pub. No.: WO84/03130

PCT Pub. Date: Aug. 16, 1984

[51] Int. Cl.$^4$ .............................................. E04C 2/34
[52] U.S. Cl. ...................................... 52/787; 411/501
[58] Field of Search .................. 52/787, 803; 411/500, 411/501, 183, 176-181

[56] References Cited

U.S. PATENT DOCUMENTS

| | | | |
|---|---|---|---|
| 2,967,593 | 1/1961 | Cushman | 52/787 |
| 3,099,057 | 7/1963 | Cook | 411/501 |
| 3,137,887 | 6/1964 | Mannino | 52/787 |
| 3,252,493 | 5/1966 | Smith | 52/787 |
| 3,296,765 | 1/1967 | Rohe | 52/787 |
| 4,056,878 | 11/1977 | Woodley | 52/787 |
| 4,232,496 | 11/1980 | Warkentin | 52/787 |
| 4,399,642 | 8/1983 | Friedrich | 52/787 |

OTHER PUBLICATIONS

The Random House College Dictionary, p. 518, (definition of Forge) ©1975.

*Primary Examiner*—Henry E. Raduazo
*Attorney, Agent, or Firm*—Hughes & Cassidy

[57] ABSTRACT

A unitary fastener insert (50) for structural sandwich panels (52) is comprised of a shaft (58) of a generally uniform circular cross section having a base (64) and a tip (62), a generally circular flange (68) extending radially outward from the base circumferentially peripheral the shaft, and a central stepped bore therethrough (72) including an enlarged fastener seat recess (78) disposed interiorly of the tip for receiving the head (90) of a fastener (54) merging to a reduced bore (82) for receiving the shank (94) of the fastener. The insert of the present invention is specifically configured for production by a forging technique, also described herein.

4 Claims, 4 Drawing Figures

UNITARY FASTENER INSERT FOR STRUCTURAL SANDWICH PANELS

TECHNICAL FIELD

The present invention relates to fastener inserts for use in securing structural sandwich panels to support members therefor, more particularly to a unitary fastener insert for disposition within a structural sandwich panel in order to provide a fastener location for receipt of a suitable fixture member for it, and most especially to such an insert specifically configured to be fabricated by a forging technique. In this general regard, the fastener insert is disposed through and bonded or otherwise secured to the panel to present a higher strength location for receiving a fastener and prevent crushing forces while holding the panel against shear forces. A highly preferred and principal adaptation of the fastener insert of the present invention is in the installation of panels in an aircraft as floor and/or bulkhead components.

DESCRIPTION OF THE BACKGROUND ART

Structural sandwich panels are, of course, well known building components, both in respect of conventional structures and in aircraft fabrication; the latter being a particularly preferred environment within the context of the present invention. The popularity of these panels is attributable to a relatively high strength-to-weight ratio, in turn a consequence of the now conventional construction employed; an aspect requiring no detailed elaboration as the same is very well known. Suffice it to say in summary terms, the sandwich panels of interest are comprised of a pair of relatively thin face sheets separated by and bonded or otherwise secured to an intermediate, foraminous or honeycomb member of relatively thicker dimension. The face sheets serve to distribute a load through the honeycomb to the supporting structure. Depending upon the anticipated loads to which the panel member will be subjected, all manner and variety of materials may be utilized and certain variations in the structural conformation of the honeycomb employed. Metals, polymeric resins, and impregnated fibrous materials have all been utilized in the past in this regard.

While these structural panels are very satisfactory in load transmission where the force is one applied over a rather large area, crushing resistance of the intermediate layer is not very great where the panel is subjected to point loads. Consequently, construction utilizing these sandwich panels is attended with certain complications; for even the force exerted by a fixture member such as a nail, screw or the like, passing through the panel can crush it locally or give rise to stress ultimately contributing to failure of the panel at fixture locations. Accordingly, numerous approaches have been devised over the years with an eye toward providing an effective means for securing these panels to support members. The conventional wisdom along these lines has suggested the use of a metallic insert passing through the panel member and through which itself the fastener may pass into cooperative engagement with a support such as a stud or rail. The insert isolates the compressive restraining force exerted by the fastener from the panel while it holds the same in shear during times of force application. Various patented fastener inserts are known in the prior art, to which attention is now directed.

U.S. Pat. No. 2,585,557 to Creimendahl discloses a multicomponent fastener insert for structural sandwich panels. That insert is comprised of a bushing disposed through the panel, optionally but preferably countersunk near the top to receive the head of a bolt or like fixture member. The lower portion of the bushing is provided with a reduced diameter to yield a shoulder with a fillet receiving a sleeve or collar as a separate component. When the panel is installed and the fastener tightened, the fillet is spread or flared into engagement with the face sheet of the panel immediately circumjacent the hole therethrough which receives the bushing, providing an integral mechanical linkage.

U.S. Pat. No. 2,961,760 to Horton et al is conceptually similar in its disclosure of an insert for a structural sandwich panel through which a fixture member is destined to pass, in this case preferably a rivet. The insert is, once again, basically a cylindrical sleeve or bushing sized to accept the head of the rivet, having a bore through which the shank thereof may pass. The sleeve is inserted within a hole through the sandwich and deformed in situ to establish cooperative association with the panel.

U.S. Pat. No. 3,042,156 and U.S. Pat. No. 3,355,850, to Rohe, as well U.S. Pat. No. 3,296,765 to Rohe et al disclose various types of fastener inserts for structural sandwich panels. Each of these inserts or spacers relies to one extent or another upon radial expansion of the same once disposed within an aperture through the panel in order to yield a mechanical interlock therewith.

Among other insert designs which employ a type of radial expansion or bulging of the device to anchor or otherwise provide operative interengagement between the insert and an associated sandwich panel may be mentioned those which are the subjects of U.S. Pat. No. 3,252,493 to Smith, U.S. Pat No. 3,313,079 to Phelan, and U.S. Pat. No. 3,651,563 to Volkmann. Further insight into additional background in respect of conceptually similar inserts and/or fasteners of this ilk may be gleaned from U.S. Pat. No. 2,967,593 and U.S. Pat. No. 3,008,552 to Cushman and Cushman et al, respectively, and U.S. Pat. No. 3,078,002 to Rodgers.

Another commercially-available fastener insert pertinent to the scope of the background art is one heretofore employed by the assignee of the present invention, which device is considered in much greater structural detail below. For present summary purposes, the insert is comprised of a shaft for disposition through the sandwich panel, with a chamfered tip adapted to be swaged, bent or crimped outward in a generally radial direction once the insert is positioned, and a base including a radially extending flange having a diameter greater than the through-hole in the panel. The insert is secured to the sandwich panel by adhesively bonding the flange to the mating face sheet. The shaft, while having an overall circular conformation, is provided with a reduced cross-section or undercut intermediate its length, principally for weight savings. That shaft includes a stepped bore for receiving a fastener, comprised of a tapered area proximate the tip for cooperation with the head of the fastener in order that the same may remain flush with the surface of the panel.

The commercial device immediately aforesaid offers a great many advantages over the patented prior art devices of the preceding discussion. Structurally, the same is of considerably less complexity and offers the further advantage of unitary construction as compared with most of the previous approaches. This contributes, in turn, to an ease of installation while maintaining the desired objectives of good pullout resistance and force transfer at fastening points. However, even this device suffers certain indigenous problems. Perhaps most significant as respects the present invention is the fact that this device is one produced by machining techniques, therefore limiting dimensional features (such as recess depth for the fastener seating tip portion), thickness of the restraining flange and even wall thickness due to inherent limitations in the machining process itself. Another significant commercial problem is the cost associated with machining, taking into account the capital expenditure for equipment, scrap generated during the procedure, disposal of that scrap and like considerations. Looking more specifically to production costs, where the panels are made of fiberglass or similar materials, aluminum inserts are satisfactory and can be produced at about 23 cents each; but, where graphite composites are employed aluminum may not be used, requiring titanium inserts at a cost of about $9.00 each. When one then considers the staggering number of inserts utilized each year, astounding costs can mount.

Accordingly, a need exists for a fastener insert which retains the basic simplicity of unitary design and its attendant advantages, but which improves upon the structural characteristics of the insert while substantially reducing cost of production.

SUMMARY OF THE INVENTION

The present invention desirably responds to the foegoing need; providing a fastener insert with the advantage of unitary design but having improved mechanical properties and a vastly lower cost of production. The improved insert of the present invention is most advantageously employed in securing structural sandwich panels as bulkhead and/or floor panel members in an aircraft or other similar environments where the panel member will experience vibration, as the instant insert enjoys the further benefit of improved fatique life.

The foregoing, and other, advantages and benefits are realized in accordance with one aspect of the present invention, where a unitary fastener insert for structural sandwich panels is comprised of a shaft of generally uniform circular cross-section having a base and a tip, a generally circular flange extending radially outward from the base circumferentially peripheral the shaft, and a central stepped bore therethrough including an enlarged fastener seat recess disposed interiorly of the tip for receiving the head of the fastener, and optionally a seal associated therewith, merging to a reduced bore for receiving the shank of the fastener. The fastener insert of the present invention may further include a weight-reducing counterbore extending upwardly from the base region in order to achieve weight savings without loss of structural integrity. The insert of the present invention is especially configured to be forged as opposed to machined, allowing for thinner sections, deeper recesses, simpler and less costly production, amongst other advantages.

The preferred production technique is a cold flow process comprised of a die heading technique for converting a generally cylindrical slug of appropriate length and diameter into the insert having the foregoing conformation. Most preferably, the forging technique is a two-die/two-blow header operation where a slug having a diameter approximately equal to the outer diameter of the shaft of the finished product is first bulbed to reduce its length and increase its diameter and thereby precondition the slug, followed by a piercing operation within the first die to develop the central stepped bore. The first blow in the second die then develops the base flange while the second blow extrudes the shank, sizes the insert to shape, and forms the seat. Any flash may then be sheared or clipped to true the flange.

Sharper structural features with lesser tendencies toward flaw, thinner sections, and deeper recesses are achieved by virtue of the particular structure of the instant insert in concert with its method of manufacture. The further and significant advantage of cost reduction, in certain cases by as much as about an order of magnitude, is particularly noteworthy.

The foregoing and other advantages will become more apparent, and a fuller appreciation of the structure and production methodology will be gained, upon a review of the following detailed description of preferred embodiments, taken in conjunction with the figures of drawing.

DETAILED DESCRIPTION OF THE INVENTION

The present invention relates to fastener inserts specifically configured for cooperative association with a structural sandwich panel in order to secure same to a support member therefor. Accordingly, the invention will now be described with reference to certain preferred embodiments and environmental implementations within the foregoing context; albeit those skilled in the art will appreciate that such a description is meant to be exemplary only and not limitative. But, prior to turning to that discussion, a detailed consideration of the structure of what is believed to be the closest prior art device is warranted in order to compare and contrast properly the advantages provided hereby.

Figure 1:
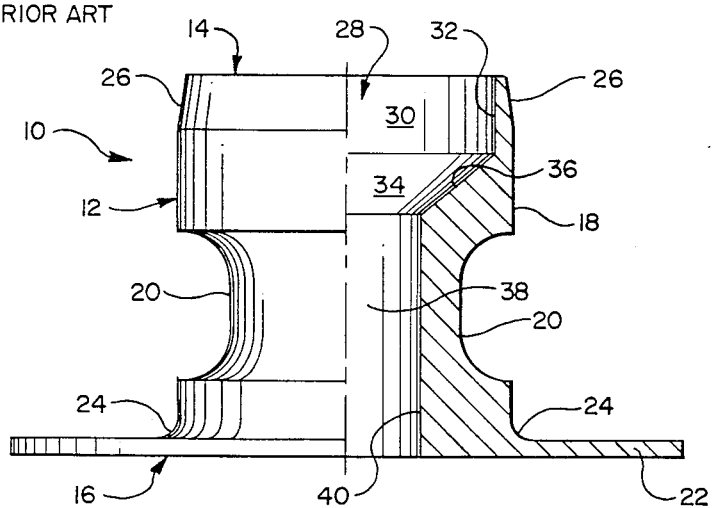
FIG. 1 is a view, partly in side elevation and partly in section, showing the structural configuration of the commercial insert described in summary terms above and which constitutes the closest approach of the prior art.

FIG. 1 shows, partly in side elevation and partly in section, a fastener insert heretofore in use, designated generally as 10. The fastener 10 has been employed by the assignee of the present invention for many years in securing structural sandwich panels, for example, as floor panels or bulkhead panels within the interior space of an aircraft. The insert 10 is a metallic insert having a composition selected to coordinate physical strength requirements with chemical effects due to the specific environment within which the insert 10 is employed, influenced in large measure by the composition of the panel itself. For example, where conventional fiberglass structural sandwich panels are those constituting the wall or bulkhead members, any one of a number aluminum alloys (e.g., 6061, 2024, 7075) serve admirably. On the other hand, with the current move toward graphite composite materials to achieve greater strength-to-weight benefits, the electro-chemical activity of aluminum in proximate engagement with graphite renders the same unusable in that environment. In such cases, titanium is the material of choice, as respects weight, strength and electro-chemical nobility.

Regardless of the specific material from which the insert 10 is fabricated, its production methodology has centered on machining techniques. The need to machine the structure of the insert 10 inherently limits certain design configurations while contributing to a relatively high cost. These aspects are best considered in terms of the precise structure of that insert.

The insert 10 is a unitary fastener insert comprised of a shaft designated generally as 12 having a tip designated generally as 14 and a base designated generally as 16. The shaft 12 has an overall generally cylindrical profile defined by a sidewall 18 undercut at 20 intermediate its length in order to achieve some weight savings. The base end of the wall 18 merges to a circular flange 22 extending radially outward from the shaft 12 from a radiused juncture 24. The tip end of the wall 18 is formed with a chamfer 26 to facilitate a later swaging or crimping of the tip when the insert 10 is installed within a panel member. The interior of shaft 12 is formed with a central bore designated generally as 28 extending from the tip through the base of the insert. The bore 28 is a stepped bore having a first region 30 in the tip region interiorly proximate the chamfer 26 and, as can be seen in the sectional portion of FIG. 1, extends downwardly slightly beyond that chamfer defined generally by interior sidewall 32. The bore region 30 progresses to a fastener seat region 34 having a sloped or tapered sidewall 36 shaped and sized to accept the head of a fastener for the panel. The bore 28 terminates in a shank receiving region 38 having a sidewall 40 dimensioned to accept the shank of the fastener used to secure the panel with which the insert 10 cooperates.

In past practice the insert 10 has been machined to the precise structure shown in FIG. 1. That technique is relatively slow, tedious, and a costly one in terms of, for example, labor time, tooling expense, and scrap generation and disposal. And, apart from those generalities, the prior machining approach to the fabrication of insert 10 has limited significantly the structural conformation and operational characteristics of the article itself. For example, wall sections possess thicknesses greater than structurally necessary or even, in some cases, desirable because the machining technique simply cannot hold tolerances and acceptable quality levels should the procedure attempt to yield thinner wall sections; likewise in respect of the thickness of the flange at the base of the insert. The radiused juncture between the shaft and the flange must be very carefully machined to avoid a point of stress concentration which would lead to failure in use; likewise in respect of the undercut for weight savings, but perhaps to a somewhat lesser degree since that region is not as highly stressed. Further along these lines, even the careful machining of the juncture between shaft and flange will not always insure acceptable failure characteristics for the insert, since the flange member is subjected to vibration contributing to cyclic stress fatigue at that point; exacerbated by, amongst other factors, the relative dimensions of the flange and shaft wall and grain exposure resulting from metal cutting. Corrosion resistance is reduced and, should a suitable electrolyte find its way to the juncture (e.g., from inadvertent spills within the aircraft), stress cracking compounded by corrosion fatigue are significant problems. It is also noteworthy that the machining technique has proven incapable of forming the fastener seat region of the central bore in the insert depp enough to accommodate a compressive seal for the fastener member itself, a highly desirable and advantageous inclusion in order to render the overall construction leakproof from the top surface. Yet, with all of these drawbacks, some quite significant, no one has advanced a realistic alternative until the development of the present invention, a description of which now ensues.

Figure 2:
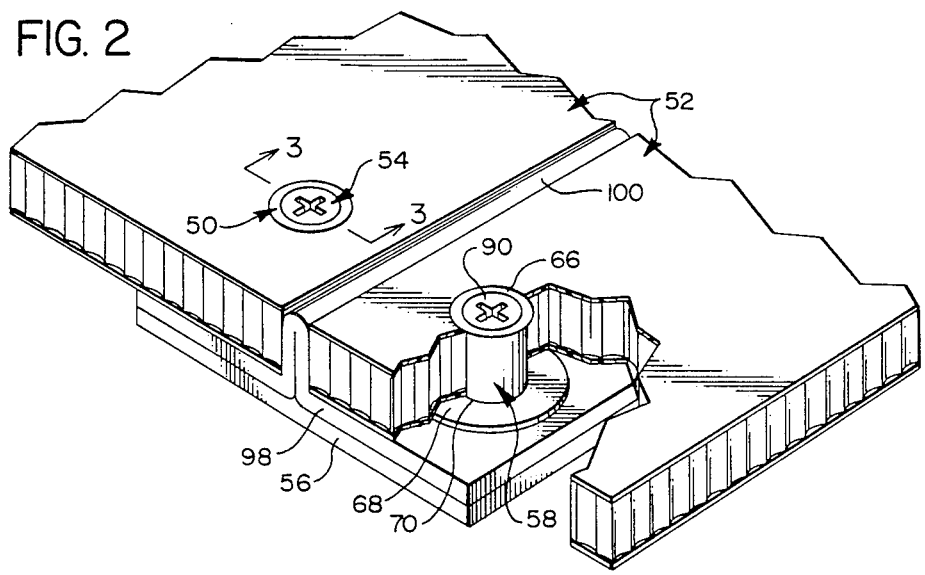
FIG. 2 is a fragmentary, perspective view, with parts broken away for clarity, showing fastener inserts in accordance with the present invention in their intended environment, namely in securing structural sandwich panels to a support member therefor, in this case the floor panels of an aircraft.
Figure 3:
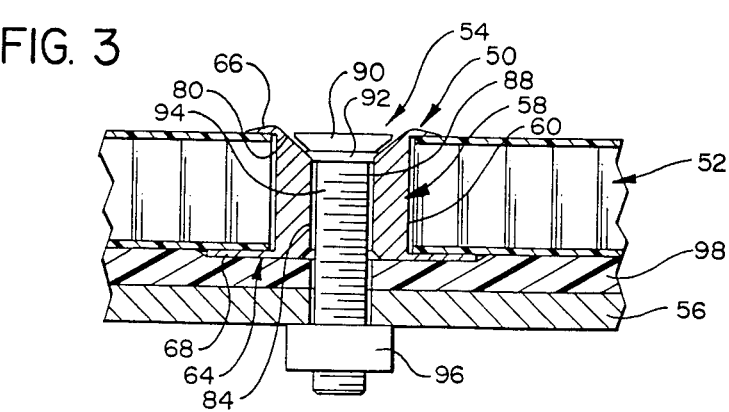
FIG. 3 is a sectional view, taken substantially along the line 3—3 of FIG. 2; and, FIG. 4 is a view similar to FIG. 1, but showing here partly in side elevation and partly in section the structural configuration of a fastener insert in accordance with the present invention.
Figure 4:
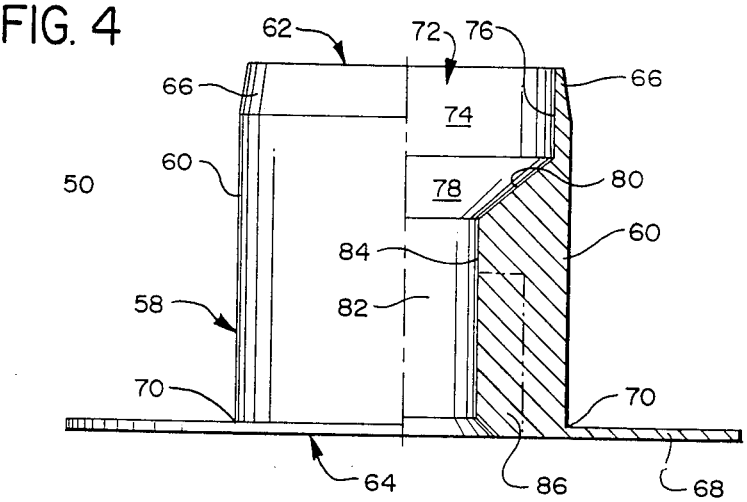

FIGS. 2 and 3 illustrate an insert in accordance with the present invention, designated generally as 50, disposed through structural panel members 52 for guiding receipt and retention of a fasteners 54 used to secure those panels to a support member 56. For ease of comparison and contrast of the fastener 50 with the fastener 10 described above, FIG. 4 shows the former in the same type of detail as provided in FIG. 1 for the latter.

The insert 50 is a unitary insert comprised of a shaft 58 of a generally uniform circular cross-section defined by a sidewall 60. The insert has a tip 62 and a base 64; the former including a chamfer 66 on the wall 60 and latter merging to a generally circular flange 68 extending radially outward from the shaft 58 at a relatively sharp juncture 70. The insert 50 is formed with a central stepped bore designated generally as 72. The bore 72 includes a first region 74 interiorly proximate the tip of the shaft defined by the extent of interior sidewall 76, shown to project lower than the chamfer 66 on the sidewall 60. The bore region 74 merges to a fastener seat region 78 circumscribed by tapered or sloped sidewall 80. The bore 72 concludes with a shank receiving region 82 bounded by an interior sidewall 84. Optionally, the bore 72 also includes a weight-reducing counterbore 86 extending upwardly from the base region 64 of the shank as shown in phantom lines in FIG. 4. The counterbore 86 expands the radius of the shank region 82, leaving the interior sidewall 84 in a step or tab-like form to define the appropriate diameter for the shank of the fastener 54 for guiding disposition therethrough; preserving the overall structural integrity of the insert while achieving a reduction in its weight—sometimes a very important consideration and particularly in connection with the use of insert 50 in an aircraft environment.

As best viewed in FIGS. 2 and 3, the insert 50 is disposed through the panel 52 within an aperture 88 formed therein. The aperture has a diameter only slightly greater than the diameter of the shaft 58 defined by the exterior sidewall 60. Accordingly, the top face of the flange 68 projects beyond the aperture 88 into mating contact with the bottom face of the panel 52. That area of contact serves as a bonding surface between the insert and the panel, a bond most preferably achieved by means of a suitable adhesive. The tip of insert 50 is crimped or swaged over in the region of chamfer 66. As shown in FIGS. 2 and 3, the extreme tip is in mechanically interlocking relationship with respect to the top face sheet of the panel 52; albeit, this is not an absolute prerequisite to the operational efficiencies of the insert 50. With the inserts 50 installed within the panels 52 as aforesaid, the same are secured to the support 56 by fastener 54. In the exemplified embodiment, the fastener 54 includes a head 90 disposed within the bore region 78 such that it is substantially flush with the top face of the panel 52. A deformable seal 92 is borne upon the fastener 54 so that the compressive fastening force will provide a leakproof seal from the top surface of the panel, an advantage which could not reasonably be attained when using the insert 10 depicted in FIG. 1; for the machining technique could not provide an adequate depth dimension for the corresponding fastener seat region 34. The fastener shank 94 passes through the bore region 82 and is shown to terminate in a fixture nut 96, although in some instances a fastener such as a self-taping screw might be utilized to eliminate that element. Regardless of that consideration, the shank 94 is guided through the insert by virtue of the inner diameter defined by interior sidewall 84. In those cases where the weight-reducing counterbore 86 is optionally elected, sufficient wall material nonetheless remains for transfer of force across the insert and distribution of same via the remaining base dimension and the flange 68. Thus, these weight savings do not entail a compromise in respect of structural integrity. In the exemplified embodiment, the panels 52 are illustrated to be floor panels in an aircraft and, accordingly, a sealing web 98 is interposed between the panels 52 and the support 56 with a fold 100 at the butt joint as shown in FIG. 2. The combination of the web 98 and deformable seal 92 insures a good, leakproof construction.

Various structural features of the insert 50 vis-a-vis the insert 10 are remarkable. As noted generally above, the seat receiving recess portion of the bore 72 (i.e., region 78) has a sufficient depth to accommodate both the head 90 of the fastener and the deformable seal 92 contrary to the limited depth of the corresponding region 34. That limitation on the prior art is one principally dictated by the conventional machining procedure employed for fabrication. Additionally, wall and flange sections are substantially reduced in thickness in the insert 50 over the corresponding sections in insert 10. The thicker sections of the insert 10 are not necessary for structural integrity as the engineering alloys conventionally utilized have sufficient strength even in these thinner sections; the limitation again being imposed by the machining technique for fabrication of the prior insert. Furthermore, the thinner wall section in the region of chamfer 66 materially aids in the installation of the insert within the panel 52 since it is more readily deformable than the thicker section of insert 10. Still further along these lines, elimination of the undercut 20 on the exterior sidewall and the presentation of a smooth, uniform shank maintains good mechanical contact between the insert panel and assists somewhat in the assembly of the insert with the panel itself. Again, because the insert 10 is a machined insert, the weight-reducing undercut could not reasonably be relocated to, e.g., the form of a weight-reducing counterbore like that provided in insert 50. Still further, the sharp juncture 70 between the flange 68 and shaft 58 of insert 50 may be included without substantial apprehension of failure at that juncture irrespective of the cyclic vibrational loads imparted to these types of devices; as opposed to not only the need for the radiused juncture 24 but the very close control over the machining procedure when that portion is being formed. These advantages, and others considered below, are achieved in one aspect of the present invention—its fabrication by a forging or die heading method of manufacture for which the insert 50 has been specifically configured.

The forging technique for fabrication of insert 50 may take any one of a number of forms. However, it has been determined that the most preferred method is a so-called two die/two blow header operation. As the name implies, the insert 50 is formed in two different die stages, and in turn each stage subjects the intermediate form of the insert to a double blow. More specifically, the method begins with the sizing of a blank or slug having proper dimensions and material mass to yield the finished insert. Most preferably, the slug is cut from a coil of wire or round stock having a diameter approximately equal to the diameter of shaft 58 when the insert is in its completed form. The slug is loaded within the first die and subjected to the first blow in a bulbing operation which reduces the length of the slug somewhat and expands its diameter somewhat in a type of preconditioning step. The preconditioned slug is then pierced on the second blow within the first die to develop the central bore. Next, the partially formed insert is transferred to the second die wherein the first blow develops the flange and, if elected, the optional counterbore. The second blow in the second die serves to extrude the shank somewhat, size the insert to shape, and form the seat region of the bore. Depending upon the apparatus employed, this second blow in the second die might be the one to form the optional counterbore as opposed to its formation in the immediately preceding step. Regardless, the finished insert is removed and subjected to a clipping operation for removal of any flash as might tend to develop around the flange. The preferred forming technique is a cold forming one which relies on material flow or displacement to develop the ultimate shape shown in FIG. 4.

Apart from the elegant simplicity of the highly preferred technique described above, and the demonstrable advantages enumerated in comparison with the insert 10 hereinabove, the very manufacturing technique itself provides further benefits. For example, there is no waste in the preferred forging technique as opposed to the machining methodology employed to fabricate insert 10. Not only does that achieve a considerable initial saving, further savings are realized by avoiding the need for scrap recycling and/or disposal. Then too, lesser material is required to form the insert 50 than the insert 10 since thinner sections can be achieved as noted above. The highly preferred forging technique for manufacturing insert 10 is also considerably faster than machining, requiring only about 10% of the total time heretofore expended. All of these production advantages lead to a most significant and surprising result; the insert 50 is considerably less expensive to make while considerably superior in performance. For example, the approximate current cost of production for the insert 10 by machining when the same is fabricated from aluminum is about 23 cents while, when graphite composites are used and thus titanium the required material, the current cost of production is approximately $9.00. The forging technique employed in accordance with the present invnetion reduces those production costs to 4 cents and 70 cents respectively—approximately an order of magnitude in savings.

The configuration of the insert 10 leads to still further benefits. Materials heretofore difficult or totally impractical for such inserts due to the required machining procedure may now readily be used in a wide range of situations. For example, the insert 50 may be fabricated from polymeric materials. Optionally, very inexpensive alloys can be utilized and then surface treated to account for environmental considerations such as the presence of corrosive substances; still retaining the benefits of substantially reduced costs of production.

The die heading operation yields the thin flange section and sharp juncture with the shaft through cold flow of material of the slug itself. Since this results in material (i.e., grain) flow as opposed to mechanical severance of the grain by a cutting tool, there are lesser tendencies toward cracking and corrosion which, as noted above, are particularly acute problems to be borne in mind especially because of cyclic vibrational stresses imparted to the flange when the same is in use.

As is now readily apparent, the insert 50 of the present invention is a considerable improvement over the prior art devices previously proposed and/or adopted in constructions utilizing structural sandwich panels. All of the positive benefits of known devices are preserved, certain new benefits provided, and yet at greater efficiency and lower cost.

While the invention has now been described with reference to certain preferred embodiments, those skilled in the art will appreciate that various substitutions, modifications, changes and omissions may be made without departing from the spirit thereof. Accordingly, it is intended that the foregoing description be viewed as exemplary only and not be deemed limitative.

I claim:

1. An insert adapted to be used in securing a structural sandwich panel to a substrate, where the panel and the substrate have first and second aligned openings, respectively, to receive said insert and a fastener which extends through said insert, and where the fastener has a downwardly tapered head portion and a shank portion which extends through said insert and through the second opening in the substrate, said insert being a substantially unitary forged structure comprising:
   a. a main body portion having a substantially uniform outer cylindrical surface and adapted to fit in the first opening in the panel;
   b. a lower peripheral flange extending outwardly from a lower edge of said insert and adapted to engage a lower surface portion of said panel surrounding said first opening;
   c. an upper peripheral annular tip portion extending upwardly from said body portion as a substantial upward cylindrical extension of said main body portion and arranged to extend above an upper panel surface portion surrounding said first opening, and further adapted to be swaged downwardly to engage said upper panel surface portion;
   d. said body portion being provided with an internal bore comprising:
      1. an upper seat region to receive the head of the fastener, said seat region being located below said tip portion and having a downwardly and inwardly extending frusto-conical surface;
      2. an intermediate generally cylindrical shank receiving region extending downwardly from a lower edge of said upper seat region;
      3. a lower counterbore region having a generally cylindrical configuration with a diameter greater than said shank receiving region and extending to said flange.

2. The fastener insert as recited in claim 1, wherein the seat region of said bore is configured to receive a fastener seal.

3. A structural combination, comprising:
   a. a structural sandwich panel having a first through opening;
   b. a subtrate positioned adjacent said panel and having a second through opening aligned with said first through opening;
   c. a fastener having a head portion with a downwardly and inwardly tapering frusto-conical surface, and a generally cylindrical shank portion adapted to extend through both of said first and second openings;
   d. an insert adapted to be used in conjunction with said fastener to secure the sandwich panel to the substrate, said insert being a substantially unitary forged structure comprising:
      1. a main body portion having a substantially uniform outer cylindrical surface and adapted to fit in the first opening in the panel;
      2. a lower peripheral flange extending outwardly from a lower edge of said insert and adapted to engage a lower surface portion of said panel surrounding said first opening;
      3. an upper peripheral annular tip portion extending upwardly from said body portion as a substantial upward cylindrical extension of said main body portion and arranged to extend above an upper panel surface portion surrounding said first opening, and further adapted to be swaged downwardly to engage said upper panel surface portion;
      4. said body portion being provided with an internal bore comprising:
         i. an upper seat region to receive the head of the fastener, said seat region being located below said tip portion and having a downwardly and inwardly extending frusto-conical surface;
         ii. an intermediate generally cylindrical shank receiving region extending downwardly from a lower edge of said upper seat region;
         iii. a lower counterbore region having a generally cylindrical configuration with a diameter greater than said shank receiving region and extending to said flange.

4. The combination as recited in claim 3, wherein the seat region of said bore is configured to receive a fastener seal.

* * * * *